United States Patent
Li et al.

(10) Patent No.: US 7,716,214 B2
(45) Date of Patent: May 11, 2010

(54) AUTOMATED AND DYNAMIC MANAGEMENT OF QUERY VIEWS FOR DATABASE WORKLOADS

(75) Inventors: Wen-Syan Li, Fremont, CA (US); Thomas Phan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 58 days.

(21) Appl. No.: 12/055,461

(22) Filed: Mar. 26, 2008

(65) Prior Publication Data

US 2008/0183667 A1    Jul. 31, 2008

Related U.S. Application Data

(63) Continuation of application No. 11/624,876, filed on Jan. 19, 2007.

(51) Int. Cl.
*G06F 7/00* (2006.01)

(52) U.S. Cl. .................................. 707/719; 707/720

(58) Field of Classification Search ................ 707/2–5, 707/705, 718, 719, 720; 711/144, 113
See application file for complete search history.

(56) References Cited

U.S. PATENT DOCUMENTS

| | | | |
|---|---|---|---|
| 6,026,391 A * | 2/2000 | Osborn et al. | 707/2 |
| 6,487,641 B1 * | 11/2002 | Cusson et al. | 711/144 |
| 2007/0083500 A1 * | 4/2007 | Zibitsker | 707/3 |
| 2007/0130107 A1 * | 6/2007 | Waas et al. | 707/2 |
| 2008/0098169 A1 * | 4/2008 | Kaluskar et al. | 711/113 |

OTHER PUBLICATIONS

Annis Kotidis et al. ("DynaMat: A dynamic view Management System for Data Warehouses" Department of Computer Science University of Maryland, Jun. 1999).*
Davis, L., "Job Shop Scheduling with Genetic Algorithms," In Proceedings of the 1st international Conference on Genetic Algorithms, 1985, 136-140.
Quass, et al., "Making Views Self-Maintainable for Data Warehousing," Proceedings of the International Conference on Parallel and Distributed Information Systems, Dec. 1996, pp. 1-17.

(Continued)

*Primary Examiner*—Hung T Vy
(74) *Attorney, Agent, or Firm*—Gibb I.P. Law Firm, LLC

(57) ABSTRACT

The embodiments of the invention provide a method, program storage device, etc. for automated and dynamic management of query views for database workloads. More specifically, a method begins by executing queries, which includes accessing a set of data tables for each of the queries. During the executing of the queries, the method accesses a required data table from a cache if the required data table is present in the cache and creates the required data table if the required data table is not present in the cache. The accessing of the required data table from the cache has a lower processing cost than accessing the required data table from a base table. Also during the executing of the queries, created data tables are stored in the cache, wherein one or more of the created data tables are removed from the cache when the cache becomes full.

19 Claims, 5 Drawing Sheets

OTHER PUBLICATIONS

Shivam, et al., "Model-Driven Placement of Compute Tasks and Data in a Networked Utility," Proceedings of the International Conference on Autonomic Computing, 2005, pp. 344-345.

Agrawal, et al., "Automated Selection of Materialized Views and Indexes for SQL Databases," Proceedings of the 26$^{th}$ International Conference on Very Large Databases, 2000, 10 pages.

Colby, et al., Algorithms for Deferred View Maintenance, In Proceedings of the ACM SIGMOD International Conference on Management of Data, Jun. 1996, pp. 469-480.

Rundensteiner, et al., "Maintaining Data Warehouses Over Changing Information Sources," Communications of the ACM, vol. 43, No. 6, Jun. 2000, pp. 57-62.

Zilio, et al, "DB2 Design Advisor: Integrated Automatic Physical Database Design," Proceedings of the 30$^{th}$ VLDB Conference, 2004, pp. 1087-1097.

Lehner, et al., "Applying Mass Query Optimization to Speed up Automatic Summary Table Refresh," In Proceedings of the International Conference on Data Engineering, 2001, pp. 1-22.

Goldstein, et al., "Optimizing Queries Using Materialized Views: A Practical, Scalable Solution," In Proceedings of the ACM SiGMOD International Conference on Management of Data, May 21-24, 2001, pp. 331-342.

The TimesTen Team, "Mid-Tier Caching: The TimesTen Approach," In Proceedings of 2002 ACM SIGMOD Conference, Jun. 4-6, 2002, pp. 1-6.

Larson, et al., "MTCache: Mid-Tier Database Caching for SQL Server," In Proceedings of the International Conference on Data Engineering, 2004, pp. 1-6.

Amiri, et al., "DBProxy: A Dynamic Data Cache for Web Applications," In Proceedings of the International Conference on Data Engineering, 2003, pp. 1-11.

Chen, et al., "The Implementation an Performance Evaluation of the ADMS Query Optimizer: Integrating Query Result Caching and Matching," In Proceedings of the 1994 Conference on Extending Data Base Technology, Oct. 1993, pp. 323-336.

Luo, et al., "Active Query Caching for Database Web Servers," In Proceedings of the 2000 WebDB (informal Proceedings), 2000, pp. 29-34.

Adali, et al., "Query Caching and Optimization in Distributed Mediator Systems," Proceedings of SIGMOD 1996 Conference on Management of Data, May 1996, pp. 137-148.

Shim, et al., "Dynamic Caching of Query Results for Decision Support Systems," In Proceedings of the 1999 Symposium on Statistical and Scientific Data Base Management, 1999, pp. 254-263.

Agrawal, et al, "Efficient View Maintenance at Data Warehouses," Proceedings of the 1997 ACM International Conference on Management of Data, May 1997, pp. 417-427.

Salem, et al, "How to Roll a Join: Asynchronous Incremental View Maintenance," Proceedings of the 2000 SCM International Conference on Management of Data, May 2000, pp. 129-140.

Oracle Corp., http://www.oracle.com/.

Holland, J., "Adaptation in Natural and Artificial Systems: An Introductory Analysis with Applications to Biology, Control, and Artificial Intelligence," MIT Press, 1992.

Goldberg, D., "Genetic Algorithms in Search Optimization and Machine Learning," Kluwer Academic Genetic Algorithms, 1985, pp. 136-140.

Gen M., et al., "Genetic Algorithms and Engineering Optimization," Wiley- Interscience, 1999.

Kotodis et al.,"Dynamic: A Dynamic View Management System for Data Warehouses," Sigmod Record ACM, USA, vol. 28, No. 2, Jun. 1999, pp. 371-382.

Lawrence et al., "Dynamic View Selection for OLAP," Data Warehousing and Knowledge Discover Lecture Notes in Computer Science, vol. 4081, 2006, pp. 33-44.

Phan et al., "Evolving Toward the Perfect Schedule: Co-Scheduling Job Assignments and Data Replication in Wide-Area Systems Using a Genetic Algorithm," Job Scheduling Strategies for Parallel Processing Lecture Notes in Computer Science, vol. 3834, 2005, pp. 173-193.

C. Sapia, "Promise: Predicting Query Behavior to Enable Predictive Caching Strategies for OLAP Systems," Data Warehousing and Knowledge Discovery. Second International Conference, Dawak 2000, Proceedings (Lecture Notes in Computer Science vol. 1874) 2000, pp. 224-233.

M. Lawrence, "Multiobjective Genetic Algorithms for Materialized View Selection in Olap Data Warehouses," Proceedings Gecco'06, Genetic and Evolutionary Computation Conference, Jul. 8, 2006, pp. 699-706.

PCT/EP2008/050458 International Search Report, International Searching Authority, Oct. 4, 2008, pp. 1-13.

* cited by examiner

|  | WITHOUT QUERY REORDERING | WITH QUERY REORDERING |
|---|---|---|
| STATIC MQT PRE-MATERIALIZATION | (1) CURRENT STATE-OF-THE-ART 0/1 KNAPSACK PROBLEM | (2) CURRENT STATE-OF-THE-ART 0/1 KNAPSACK PROBLEM |
| DYNAMIC MQT MATERIALIZATION AND REPLACEMENT | (3) SUBSPACE OF OUR WORK | (4) RESEARCH WORK PRESENTED IN THIS PAPER |

FIG. 1

```
{
  t = 0;
  initialise P(t) ;
  evaluate P(t) ;
  while ( ! done)
  {
      alter P(t); / * recombine/mutate */
      t = t + 1 ;
      select P(t) from P(t - 1) ;
      evaluate P(t) ;
  }
}
```

FIG. 2

AUTOMATED AND DYNAMIC MANAGEMENT OF QUERY VIEWS FOR DATABASE WORKLOADS

This application is a Continuation of U.S. application Ser. No. 11/624,876 filed Jan. 19, 2007, the complete disclosure of which, in its entirety, is herein incorporated by reference.

BACKGROUND

1. Field of the Invention

The embodiments of the invention provide a method, program storage device, etc. for automated and dynamic management of query views for database workloads.

2. Description of the Related Art

Within this application several publications are referenced by arabic numerals within parentheses. Full citations for these, and other, publications may be found at the end of the specification immediately preceding the claims. The disclosures of all these publications in their entireties are hereby expressly incorporated by reference into the present application for the purposes of indicating the background of the present invention and illustrating the state of the art.

A materialized view, or materialized query table (also referred to herein as "MQT" or "data table"), is an auxiliary table with precomputed data that can be used to significantly improve the performance of a database query. With its MQT matching capability, a database query optimizer can explore the possibility of reducing the query processing cost by appropriately replacing parts of a query with existing and matched MQTs.

A query rewritten to utilize the MQT has one join operation instead of two, thus allowing its query processing cost to be reduced significantly. Since the creation of MQTs can be expensive compared to the benefit of the MQTs to a single query, MQTs are usually created for the whole batch query workload so that the accumulated benefits exceed the cost of their materialization.

SUMMARY

The embodiments of the invention provide a method, program storage device, etc. for automated and dynamic management of query views for database workloads. More specifically, a method begins by executing queries, which includes accessing a set of data tables (also referred to herein as "materialized views") for each of the queries. The data tables summarize common portions of the queries. During the executing of the queries, the method accesses a required data table from a cache if the required data table is present in the cache. The method creates the required data table if the required data table is not present in the cache and if a benefit of accessing the required data table exceeds a cost of creating the required data table. The accessing of the required data table from the cache has a lower processing cost than accessing the required data table from a base table.

Also during the executing of the queries, created data tables are stored in the cache, wherein one or more of the created data tables are removed from the cache when the cache becomes full. Prior to the executing of the queries, the cache comprises zero required data tables.

In addition, the method reorders the queries. This can include creating workloads such that each of the workloads represents an ordering of the queries, wherein the workloads are recombined and/or mutated to create new orderings of the queries. Next, one of the new orderings of the queries is identified as an ordering having a lowest processing cost. The method also includes calculating a net benefit of a data table by subtracting a cost of executing a query with the data table from a cost of executing the query without the data table and multiplying by a total number of occurrences of the data table within the queries. The reordering of the queries can be based on a ranking of net benefits of the data tables.

Accordingly, the embodiments of the invention provide an automated, dynamic view management scheme that materializes views on-demand as a workload is executing and manages the views with an least recently used (LRU) cache. In order to maximize the benefit of executing queries with materialized views, the scheme makes an adaptive tradeoff between the view materializations, base table accesses, and the benefit of view hits in the cache. To find the workload permutation that produces the overall highest net benefit, a genetic method is used to search the N! solution space.

These and other aspects of the embodiments of the invention will be better appreciated and understood when considered in conjunction with the following description and the accompanying drawings. It should be understood, however, that the following descriptions, while indicating preferred embodiments of the invention and numerous specific details thereof, are given by way of illustration and not of limitation. Many changes and modifications may be made within the scope of the embodiments of the invention without departing from the spirit thereof, and the embodiments of the invention include all such modifications.

BRIEF DESCRIPTION OF THE DRAWINGS

The embodiments of the invention will be better understood from the following detailed description with reference to the drawings, in which:

FIG. 1 illustrates a classification of MQT management scenarios table;

FIG. 2 illustrates a pseudocode for a genetic search method;

DETAILED DESCRIPTION OF PREFERRED EMBODIMENTS

Figure 3:
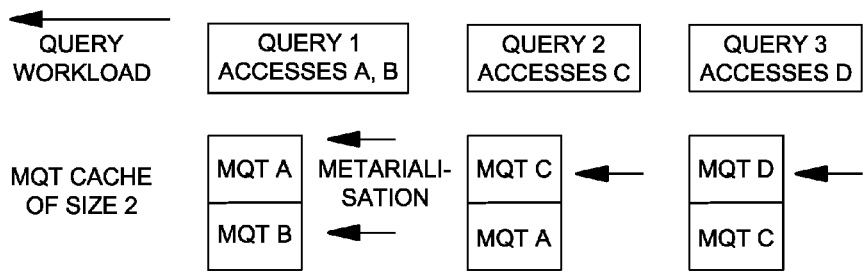
FIG. 3 illustrates MQT creation.

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

The embodiments herein provide an automated, dynamic view management scheme that materializes views on-demand as a workload is executing and manages the views with an LRU cache. In order to maximize the benefit of executing queries with materialized views, the scheme makes an adaptive tradeoff between the view materializations, base table accesses, and the benefit of view hits in the cache. To find the workload permutation that produces the overall highest net benefit, a genetic method is used to search the N! solution space.

As MQTs are required in OLAP (Online Analytical Processing) applications in which the query workloads tend to have complex structure and syntax, a Materialized Query Table Advisor (MQTA), such as the IBM DB2 Design Advisor [1], available from International Business Machines, Armonk, N.Y., USA, is often required to recommend MQTs and appropriate indexes on them. While referring to an MQT, embodiments herein assume that it includes its appropriate indexes.

An MQTA takes a workload (the read and write queries to the database system) and the database space size allocated for MQTs (i.e. MQT cache size) as the input. It first performs workload compression to remove those insignificant queries which are inexpensive or infrequent. It then performs multi-query optimization [2] to derive common parts in the workload and generates candidate MQTs.

First, the MQTA calculates the benefits of these candidate MQTs in terms of resource time reduction and calculates the overhead (in terms of resource time) for refreshing MQTs by incorporating database updates and estimates the size of the MQTs. Next, the MQTA calculates the utility of each MQT by dividing net benefit (i.e. benefit minus overhead of creating the MQT) by the size of the MQT and its index size. The MQTA then recommends the MQTs whose utility values are higher than a given threshold.

In addition to IBM DB2 Design Advisor [1, 3], several vendors have MQTAs, including Oracle 10g [4] and SQL Server [5]. These advisors deploy a common static approach to managing database views: the views are prematerialized prior to executing the workloads. While this approach is sound when the size of the viewset (i.e., a set of views) on disk is small, it will not be able to materialize all views when faced with real-world constraints (such as view maintenance costs or disk space limits) and thus will fail to exploit the potentially large benefits of those views not selected for materialization.

Previous industry and academic research efforts in this area have concentrated on the aspect of finding the best candidate MQT set to pre-materialize. The embodiments of the invention follow a complementary approach and present an automated, dynamic view management scheme that materializes MQTs on-demand as a batch workload executes and manages the MQTs with an LRU cache. To maximize the benefit of executing queries with cached MQTs, the scheme makes an adaptive tradeoff between the cost of MQT materializations, the cost of accessing base tables in lieu of the MQT, and the benefit of MQT cache hits. To achieve high MQT cache hits, the order of the queries in the workload are permuted, and the permutation that produces the overall highest benefit is found using a self-adapting genetic method to search the N! permutation solution space.

In FIG. 1, MQT management scenarios are classified into four categories based on two conditions, namely whether or not query workloads can be reordered and whether or not MQTs can be materialized and replaced dynamically. Using current MQT advisors, such as described in [1], MQTs are recommended and created to fill the disk space that users specify. The recommended MQTs (and their indexes) are materialized in advance before workloads are executed. During the execution of the workloads, the MQTs are not replaced. As the MQTs are fixed during the workload execution, whether or not the workload is reordered will not make any difference. These are scenarios (1) and (2).

Scenarios (3) and (4) represent dynamic materialization and replacement of MQTs. Without the possibility of workload reordering, an MQT is materialized, e.g., $MQT_x$, as long as its net benefit (i.e. total benefit minus materialization cost) is positive before it is replaced by another $MQT_y$ at $T_0$.

With the possibility of reordering the query workload as in scenario (4), if there are queries that arrive after $T_0$ and can benefit from $MQT_x$, it may be desirable to execute these queries before swapping out $MQT_x$. Therefore, in the scenario (4) the highest flexibility for managing MQTs is offered to minimize the response time of a query workload. The embodiments of the invention focus on scenario (4), which subsumes (3).

For example, a batch workload's execution and interaction with the MQTs can be modeled in the following manner. The workload is represented as a queue of N queries. It is assumed that an MQT Advisor product then generates a list of M candidate MQTs that are beneficial to the workload. N is typically larger than M (for example, in some experiments N=200 and M=20). It is further assumed that the MQTs are read-only and that the queries are mutually independent of one another.

The M candidate MQTs are then randomly mapped to the N queries to model the situation where each query makes use of a small set of MQTs. The number of MQTs per query is randomly chosen for each query based on a nonuniform distribution ranging from 0 MQTs/query to 4 MQTs/query. The assignment of which MQTs to belong to a given query is determined with a uniform random distribution. The size of individual MQTs is determined by a Gaussian random variable with a varying mean determined by experiment; the sizes are typically on the order of tens to hundreds of MBytes. The queries in the workload are executed sequentially in the order that they appear in the queue. For each query, the assigned MQTs on disk are in turn accessed sequentially.

Three approaches to MQT management are modeled. First, in the static model, the MQTs are pre-materialized before the workload begins and are used throughout the workload. If an MQT does not exist for a given query, the query must access the base table to get the data. Next, in the dynamic simple model, the MQTs are aggressively materialized on-demand and managed in an LRU cache. When a query executes and its needed MQT does not exist (i.e. upon cache miss), the MQT is always materialized. Additionally, the dynamic advanced model is a compromise between the previous models. An LRU cache is still maintained, but MQTs are not always materialized when there is a cache miss. Instead, a subset of available candidate MQTs that are managed via the cache are created, and for those MQTs not in this set, queries access their respective data by reading from the base tables.

The dynamic simple model is too aggressive in materializing MQTs on-demand; this aggression is throttled in the dynamic advanced model.

In the static model commonly used by current commercial database products, a subset of the candidate MQTs is chosen to be pre-materialized before the workload is executed. Previous research has focused on finding the best MQTs to place into the candidate set. The candidate MQTs produced from the MQT advisor are then typically first scanned and then sorted by decreasing benefit. Informally, the benefit of an individual MQT is a measure of how much it improves the execution time of a query. The embodiments herein follow a simplified benefit model that calculates the benefit $B_i$ of the $i^{th}$ MQT as follows. First, let $\gamma$ be the cost of a query to execute without an MQT in units of time. This includes the cost for the query to access the base tables. Second, let $\kappa$ be the cost of a query to execute with an MQT in units of time.

The difference $\gamma-\kappa$ is the benefit of one use of the MQT. The benefit $B_i$ is then simply the sum of all the benefits of MQT i across all queries in the workload. Once $B_i$ is calculated for all the MQTs, the MQTs are sorted based on this score. The score is the benefits divided by MQT size.

Given a list of these MQTs sorted on benefit score, the system materializes the MQTs in decreasing benefit order until a disk usage limit is reached. These pre-materialized MQTs are kept on disk throughout the execution of the workload. If a query requires an MQT that has not been materialized, the query must access a base table.

When the size of the candidate MQT set is small and can fit on disk, this approach is sound. However, due to real world limits, not all beneficial MQTs will be pre-materialized. For instance, the view maintenance cost may be too high or the disk space may be too small. Those queries whose required MQTs have not been materialized instead incur the cost of accessing the base tables, which can have a substantially negative impact in workload performance. The static approach thus will fail to exploit the potentially large benefits of those MQTs that were not selected for materialization.

In the dynamic models of the embodiments herein, the MQTs are not pre-materialized. Instead, MQTs are materialized on-demand when queries execute and are managed in an LRU cache. Such an approach makes a tradeoff between the negative cost of materialization time and the positive benefit of MQT hits in the cache which obviate the need to access base tables.

The rationale for the dynamic models can be seen with the following intuitive example. A workload comprises five queries, each of which access the same MQT. The cost of materializing the MQT is 2000 seconds, the cost of executing the query with the MQT is 100 seconds, and the cost of executing the query without the MQT is 500 seconds. If all five queries execute without the MQT, the workload execution time is 500×5=2500 seconds. On the other hand, if the MQT is used and materialized on-demand in the cache, then the execution time is 2000+100×5=2500, which represents a one-time materialization cost and five successive hits in the cache. It can be seen that if there are six or more hits of the MQT in the cache, then the on-demand materialization approach provides greater benefit than running the workload without the MQT materialized because MQT hits in the cache makes accessing the base tables unnecessary. In the case of the static approach, not having a needed MQT available can be likely if the disk limit was already reached during the pre-materialization phase.

The dynamic models execute by sequentially running the queries in the workload queue. Each query has its own MQT set, and for each MQT in the set, the MQT's benefit is calculated based upon whether or not the MQT is present in the cache. If there is an MQT hit, the MQT is accessed. If there is an MQT miss, the MQT is materialized at that moment and placed into the cache. If an MQT must be removed from the cache to make room, eviction follows LRU policy; however, if a cached MQT is to be evicted but is in the set of required MQTs for the current query, then the MQT is kept in the cache.

The quantitative benefit of the MQTs for the workload can be calculated as follows. First, let N be the number of queries in the workload queue; let $S_i$ be the set of MQTs required by query i and $|S_i|$ be the set's size; and, let $\gamma$ be the cost of a query to execute without an MQT in units of time. This includes the cost for the query to access the base tables (same as in the static model). Further, let $\kappa$ be the cost of a query to execute with an MQT in units of time (same as in the static model); and, let $\lambda$ be the cost to materialize an MQT in units of time. Let hit(i) be 1 if accessing MQT i incurs a cache hit and 0 otherwise; and, let miss(i) be 1 if accessing MQT i incurs a cache miss and 0 otherwise. For a given MQT, a cache hit and a cache miss are mutually exclusive. It is apparent that hit(i) and mat(i) vary over time based on the cache state. Furthermore, for simplicity, it is assumed that $\gamma$, $\kappa$, and $\lambda$ are constant for all MQTs.

The net benefit B of executing the queries with the MQTs over executing without the MQTs can be calculated using the following equation.

$$B = \sum_{i=1}^{N} \sum_{j=1}^{|S_i|} \text{hit}(j) \cdot (\gamma - \kappa) + \text{miss}(j) \cdot (\gamma - \lambda)$$

The inner summation represents the net benefit for executing one query with its set of MQTs. The difference $\gamma-\kappa$ is always positive, whereas $\gamma-\lambda$ is negative. The outer summation represents the net benefit for all the queries in the workload in the order that they appear.

In the dynamic simple model, all the MQTs in the candidate MQT set (as suggested by the MQT Advisor) are managed via the LRU cache. However, this approach may be too aggressive in its materializations: some MQTs suggested by the MQTA are not used often enough during the workload to warrant multiple materializations and evictions via the cache. The end result for these MQTs is that their net benefit across the workload is a negative value. Thus, a dynamic advanced model is also provided wherein a subset of the candidate MQT set is managed via the cache. This subset is found as follows. After the workload is simulated once and negative-valued MQTs are found, a binary search is performed on the size of the candidate MQT set. For these reduced sizes, the candidate MQTs are sorted by their net benefit from the previous simulation round and are selected on decreasing order. The dynamic advanced model produces a better query workload execution than either the static model (which produces too many base table accesses) or the dynamic simple model (which produces too many materializations).

In both dynamic models, the net benefit depends on the occurrence of MQT hits and misses in the cache, which in turn is a consequence of the query order in the workload. Reordering is performed due to the cache's LRU replacement policy; it is desirable to have as many cache hits as possible, but this situation prefers that MQT accesses be grouped together to exploit temporal locality before eviction.

Given these observations, the complexity of maximizing the benefit attained via the dynamic models reduces to the problem of finding the optimal permutation of the workload queue that produces the highest net benefit of MQT use. Although an LRU cache can be used to manage the MQTs, this selection of replacement policy is only a matter of choice: because the common nature of replacement policies is to exploit locality of reference in the access stream, the fundamental problem is finding an optimal permutation of the workload that can take advantage of whatever policy is being used.

With a queue size of N queries, there are N! permutations to search. Even with a small workload (e.g. N=20), the search space is prohibitively large for an exhaustive search. Thus, a genetic search heuristic is provided for finding the optimum permutation.

Given a search space of N! permutations of the query workload, the problem is to find the optimal workload order that produces the highest benefit via the use of the MQTs. To examine this solution space, a self-adapting genetic method (GM) search heuristic is used [6, 7]. A GM simulates Darwinian natural selection by having population members (genetic chromosomes) compete against one another over successive generations in order to converge toward the best solution. As shown in FIG. 2, chromosomes evolve through multiple generations of adaptation and selection. In this code, the variable t represents the current generation and P(t) represents the population at that generation.

Although other search heuristics exist that can solve optimization problems (e.g. simulated annealing or steepestascent hill-climbing), the dynamic MQT management problem lends itself well to a GM because potential solutions can be represented as a permutation of unique integers identifying the queries in the workload. A given ordering of the integers represents a particular query order, which in turn determines the order that the MQTs are accessed. This permutation-based representation is known in GM research and allows the leveraging of prior research in effective chromosome recombination (e.g. [8]).

A GM proceeds as follows. Initially a random set of chromosomes (also referred to herein as "workloads") is created for the population. The chromosomes are evaluated (hashed) to some metric, and the best ones are chosen to be parents. Thus, the evaluation produces the net benefit of executing the workload, accessing MQTs, and materializing/evicting MQTs in the cache. The parents recombine to produce children, simulating sexual crossover, and occasionally a mutation may arise which produces new characteristics that were not available in either parent. An adaptive mutation scheme is further provided whereby the mutation rate is increased when the population stagnates (i.e. fails to improve its workload benefit metric) over a prolonged number of generations. The children are ranked based on the evaluation function, and the best subset of the children is chosen to be the parents of the next generation, simulating natural selection. The generational loop ends after some stopping condition is met; e.g., end after 1000 generations had passed, as this value is a tradeoff between simulation execution time and thoroughness of the search. Converging toward and finding the global optimum is not guaranteed because the recombination and mutation are stochastic.

As mentioned, the chromosomes are permutations of unique integers. Recombination of chromosomes is applied to two parents to produce a new child using a two-point crossover scheme [8] where a randomly chosen contiguous subsection of the first parent is copied to the child, and then all remaining items in the second parent (that have not already been taken from the first parent's subsection) are then copied to the child in order of appearance. The uni-chromosome mutation scheme chooses two random items from the chromosome and reverses the elements between them, inclusive. Other recombination and mutation schemes may also be utilized.

A GM component is the evaluation function. Given a particular chromosome representing one workload permutation, the function deterministically calculates the net benefit of using MQTs managed by an LRU cache during the workload. The calculations are based on the following equation:

$$B = \sum_{i=1}^{N} \sum_{j=1}^{|S_i|} \text{hit}(j) \cdot (\gamma - \kappa) + \text{miss}(j) \cdot (\gamma - \lambda)$$

The evaluation function can be replaced if desired; for example, other evaluation function can model different cache replacement policies or execution of queries in parallel.

The above analysis provides a compact metric for resource utilization. The response time for the user can be further improved with an additional optimization. In the scheduling method, MQT materialization is considered as the needed "pre-staging" of a query or set of queries. The scheduling method defines the partial order of events, namely query execution and MQT materialization/eviction. In terms of the query execution, other components such as the query patroller or workload manager will take the schedule and execute them as efficiently as possible (sequentially or in parallel) to yield the shortest elapsed time. To yield the shortest query execution, the system needs to know various parameters such as CPU utilization, I/O bandwidth, and the number of connections.

The embodiments herein consider the pre-staging of the MQTs in preparation for the queries to execute. The dynamic MQTs are materialized dynamically, which imposes a materialization time cost (in addition to the resource usage cost noted above). FIG. 3 illustrates MQT creation, where the MQTs are materialized on-demand when an MQT is scheduled to execute. For example, when query 320 is scheduled, its needed MQT (MQT C) is materialized into the cache.

Specifically, FIG. 3 illustrates a query workload having Query 1, Query 2, and Query 3. Query 1 accesses MQT A and MQT B; Query 2 accesses MQT C; and, Query 3 accesses MQT D. Thus, during Query 1, the MQT cache (having a maximum capacity of two MQTs) includes MQT A and MQT B. During Query 2, the MQT cache includes MQT C and MQT A. Finally, during Query 3, the MQT cache includes MQT C and MQT D.

Figure 4:
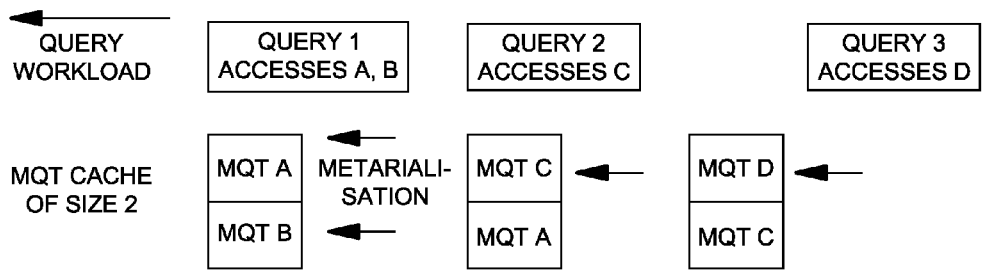
FIG. 4 illustrates early MQT creation optimization.

This materialization time cost can be potentially hidden from the user by having the MQT materialized before the query is executed, so that by the time the query is due to start, all its needed MQTs are already in the cache. FIG. 4 shows optimization where the materialization is performed early. For example, before query 3 executes, its needed MQT (MQT D) is materialized while query 2 is executing. This approach prefers that the system look into the cache to see if there is available space to hold the needed MQTs; if there is not, previous MQTs are evicted, but only if they are not currently being used by an executing query. If the needed MQTs cannot be materialized, the system performs materialization at the time new query executes, essentially falling back to the approach and analysis presented above.

Figure 5:
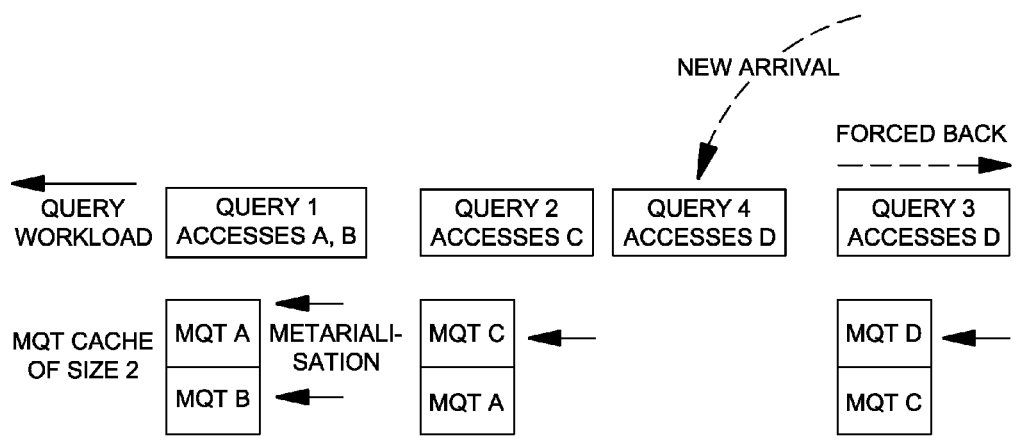
FIG. 5 illustrates query preemption.

The description above naturally supports batch query workloads, which is a common scenario. Incoming queries can be supported in two ways. First, query preemption relies on an already-generated batch workload schedule; it is diagrammed in FIG. 5. When a batch query workload is scheduled, the MQTs are materialized dynamically and reside in the cache according to the query order generated by the genetic method. Thus, given that the query order is known, the period of time that each MQT stays materialized in the cache is also known; this is called the MQT materialization schedule. When a new query arrives (e.g., Query 4), its required MQTs is observed (e.g., MQT C) and the MQT materialization schedule is searched for a time slot when the query's MQT is materialized in the cache (e.g., during the execution of Query 2). If no time slot exists that will satisfy all of the query's needed MQTs, the slot with the most beneficial MQTs is chosen. The query is then inserted into the query workload schedule, thereby preempting all subsequent queries in the workload (e.g., Query 3). The tradeoff is that the queries that were already scheduled will be delayed unfairly, but the benefit will be that the incoming queries will be satisfied in this framework.

Thus, with query preemption, new incoming queries can preempt queries in the in-progress workload. The position of the preemption in the workload is chosen to maximize MQT use by the incoming query. The drawback to this scheme is that in-progress queries are unfairly pushed back.

Secondly, an entirely new schedule for both incoming and existing queries can be created. Considering the same scenario above where a batch query workload has been scheduled, when new queries arrive, they can aggregated together to create a new workload batch; this new batch is no longer added to either when a periodic timer runs out or when a batch size limit is reached. When the new batch is ready, the previous batch may or may not have already ended. In the former case, the new batch is scheduled as in the original method. In the latter case, the remainder of the current batch workload can be combined with the new batch, and the genetic method can be run to produce a new schedule. By working on the aggregate workload that contains both prior and new queries, the GM will ideally produce a very tight schedule. Running the GM in this case takes into consideration that some MQTs have already been materialized and are already in the cache.

In addition, the above two methods may be combined to suit the nature of the incoming queries. Depending on the distribution of the incoming queries' workload size and arrival rate, a user can switch dynamically between the two strategies.

Accordingly, the embodiments of the invention provide methods for automated and dynamic management of query views for database workloads. More specifically, a method begins by executing queries, which includes accessing a set of data tables (also referred to herein as "MQTs" or "materialized views") for each of the queries. The data tables summarize common portions of the queries. As discussed above, with its MQT matching capability, a database query optimizer can explore the possibility of reducing the query processing cost by appropriately replacing parts of a query with existing and matched MQTs.

During the executing of the queries, the method accesses a required data table from a cache if the required data table is present in the cache. The method creates the required data table if the required data table is not present in the cache and if a benefit of accessing the required data table exceeds a cost of creating the required data table. As discussed above, the dynamic advanced model is a compromise between the static model and the dynamic simple model. An LRU cache is still maintained, but MQTs are not always materialized when there is a cache miss. Instead, a subset of available candidate MQTs that are managed via the cache are created, and for those MQTs not in this set, queries access their respective data by reading from the base tables. The accessing of the required data table from the cache has a lower processing cost than accessing the required data table from a base table.

Also during the executing of the queries, created data tables are stored in the cache, wherein one or more of the created data tables are removed from the cache when the cache becomes full. As discussed above, if an MQT must be removed from the cache to make room, eviction follows LRU policy; however, if a cached MQT is to be evicted but is in the set of required MQTs for the current query, then the MQT is kept in the cache. Prior to the executing of the queries, the cache comprises zero required data tables.

In addition, the method reorders the queries. As discussed above, the net benefit depends on the occurrence of MQT hits and misses in the cache, which in turn is a consequence of the query order in the workload. Reordering is performed due to the cache's LRU replacement policy; it is desirable to have as many cache hits as possible, but this situation prefers MQT accesses be grouped together to exploit temporal locality before eviction.

Thus, workloads can be created such that each of the workloads represents an ordering of the queries. As discussed above, a random set of workloads is initially created for the population. The workloads are evaluated (hashed) to some metric, and the best ones are chosen to be parents. Thus, the evaluation produces the net benefit of executing the workload, accessing MQTs, and materializing/evicting MQTs in the cache. Further, the workloads are recombined and/or mutated to create new orderings of the queries. As discussed above, the parents recombine to produce children, simulating sexual crossover, and occasionally a mutation may arise which produces new characteristics that were not available in either parent. An adaptive mutation scheme is further provided whereby the mutation rate is increased when the population stagnates (i.e. fails to improve its workload benefit metric) over a prolonged number of generations. Next, one of the new orderings of the queries is identified as an ordering having a lowest processing cost. As discussed above, the children are ranked based on the evaluation function, and the best subset of the children is chosen to be the parents of the next generation, simulating natural selection. The method also includes calculating a net benefit of a materialized view by subtracting a cost of executing a query with the materialized view from a cost of executing the query without the materialized view and multiplying by a total number of occurrences of the materialized view within the queries. The reordering of the queries can be based on a ranking of net benefits of the materialized views.

Figure 6:
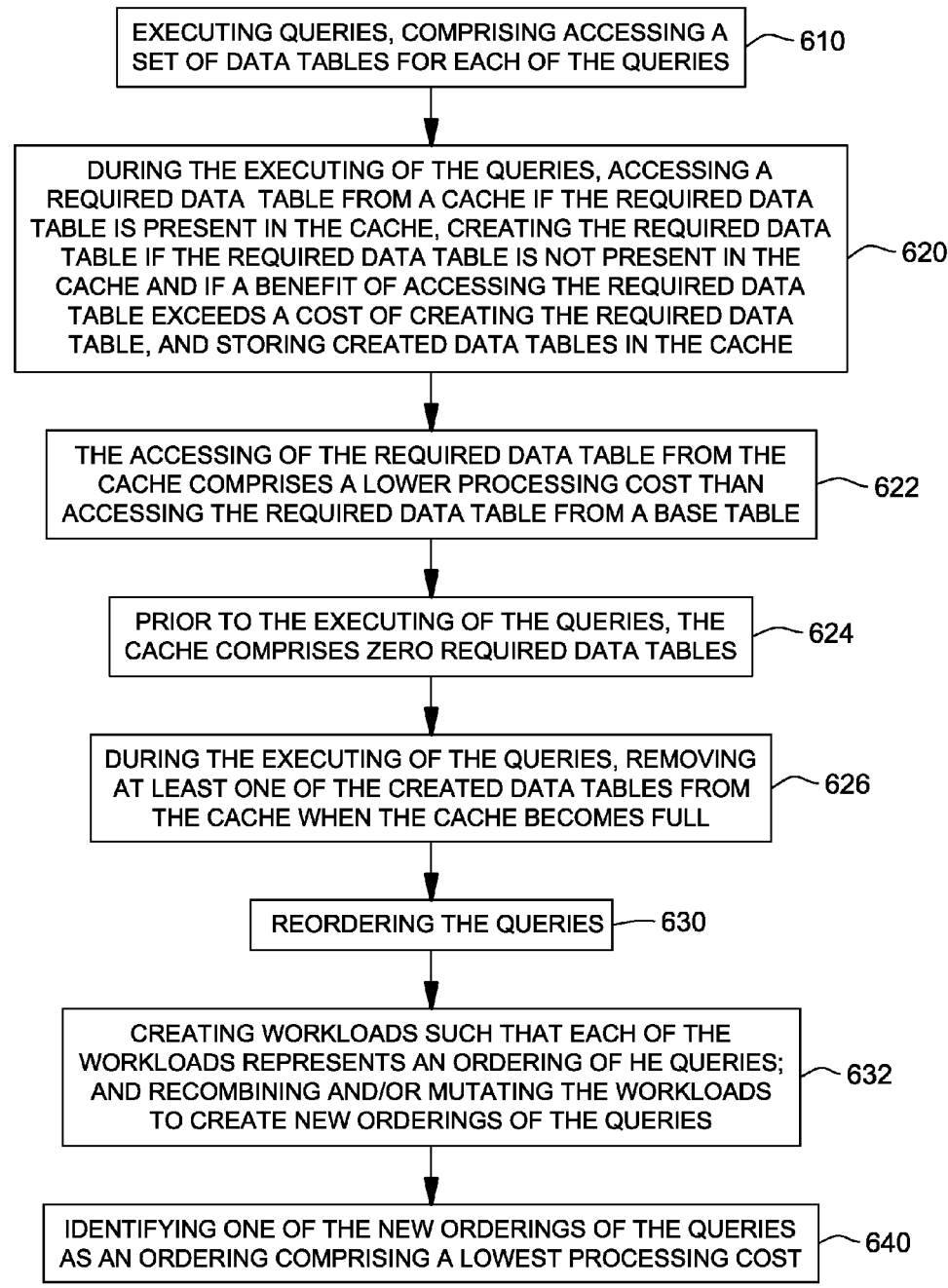
FIG. 6 is a flow diagram illustrating a method for automated and dynamic management of query views for database workloads.

FIG. 6 is a flow diagram illustrating a method 600 for automated and dynamic management of query views for database workloads. The method 600 begins in item 610 by executing queries, which includes accessing a set of data tables for each of the queries. As discussed above, with its MQT matching capability, a database query optimizer can explore the possibility of reducing the query processing cost by appropriately replacing parts of a query with existing and matched MQTs.

During the executing of the queries, in item 620, the method 600 accesses a required data table from a cache if the required data table is present in the cache, creates the required data table if the required data table is not present in the cache and if a benefit of accessing the required data table exceeds a cost of creating the required data table, and stores created data tables in the cache. As discussed above, the dynamic advanced model is a compromise between the static model and the dynamic simple model. An LRU cache is still maintained, but MQTs are not always materialized when there is a cache miss.

In item 622, the accessing of the required data table from the cache comprises a lower processing cost than accessing the required data table from a base table. In item 624, prior to the executing of the queries, the cache comprises zero required data tables. Also during the executing of the queries, in item 626, at least one of the created data tables is removed from the cache when the cache becomes full. As discussed above, if an MQT must be removed from the cache to make room, eviction follows LRU policy; however, if a cached MQT is to be evicted but is in the set of required MQTs for the current query, then the MQT is kept in the cache.

Following this, in item 630, the method 600 reorders the queries. As discussed above, reordering is performed due to the cache's LRU replacement policy; it is desirable to have as many cache hits as possible, but this situation prefers MQT accesses be grouped together to exploit temporal locality before eviction. Reordering includes, in item 632, creating workloads such that each of the workloads represents an ordering of the queries; and recombining and/or mutating the workloads to create new orderings of the queries. As discussed above, a GM simulates Darwinian natural selection by having population members (genetic workloads) compete against one another over successive generations in order to converge toward the best solution. Workloads evolve through multiple generations of adaptation and selection. Next, in item 640, one of the new orderings of the queries is identified as an ordering comprising a lowest processing cost. As discussed above, the evaluation produces the net benefit of executing the workload, accessing MQTs, and materializing/evicting MQTs in the cache.

Figure 7:
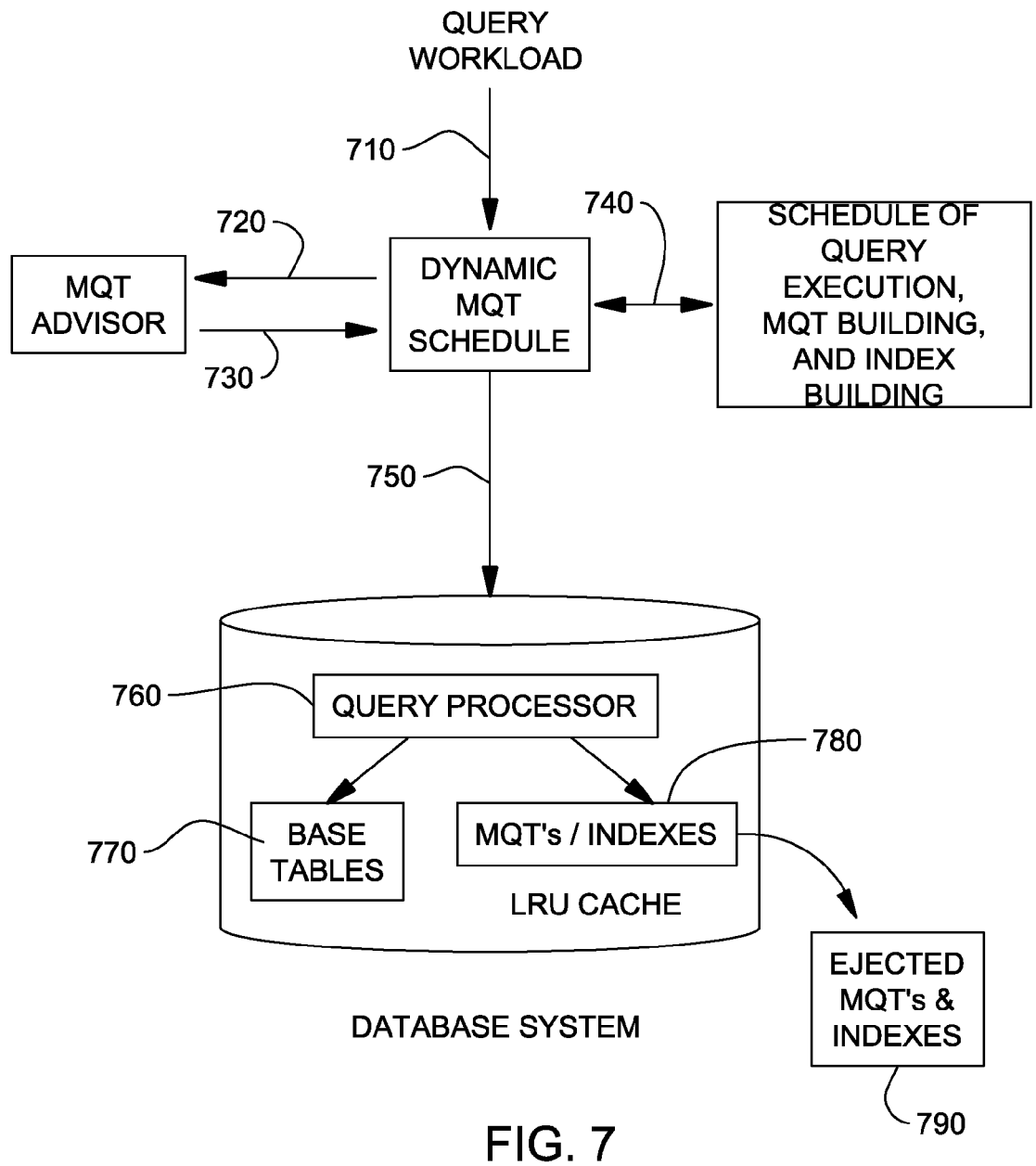
FIG. 7 is a flow diagram illustrating another method for automated and dynamic management of query views for database workloads.

FIG. 7 illustrates another flow diagram comprising item 710, wherein a query workload is submitted to the database and intercepted by the dynamic MQT scheduler (DMS). Next, the query workload is sent to the MQT advisor for recommending candidate MQT and indexes (item 720); and, the MQT advisor returns candidate MQTs/indexes, their size/benefits/creation cost, as well as queries to MQTs/index mapping (item 730). Based on the information sent by the MQT advisor, in item 740, the DMS generates execution sequence (query, MQT/index creation. Based on the execution sequence in item 740, the DMS issues commands to the database system in item 750. Following this, in item 760, the query processor receives the commands from the DMS and executes them. Both base tables (item 770) and MQTs/index (item 780) are used in the query processing if MQTs/indexes generate benefits. If a MQT/index needs to be created (and issued by the DMS), and there is no space left in the LRU cache, the LRU cache ejects less recently used objects to have space for the requested MQTs/indexes (item 790).

The embodiments of the invention can take the form of an entirely hardware embodiment, an entirely software embodiment or an embodiment including both hardware and software elements. In a preferred embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 8:
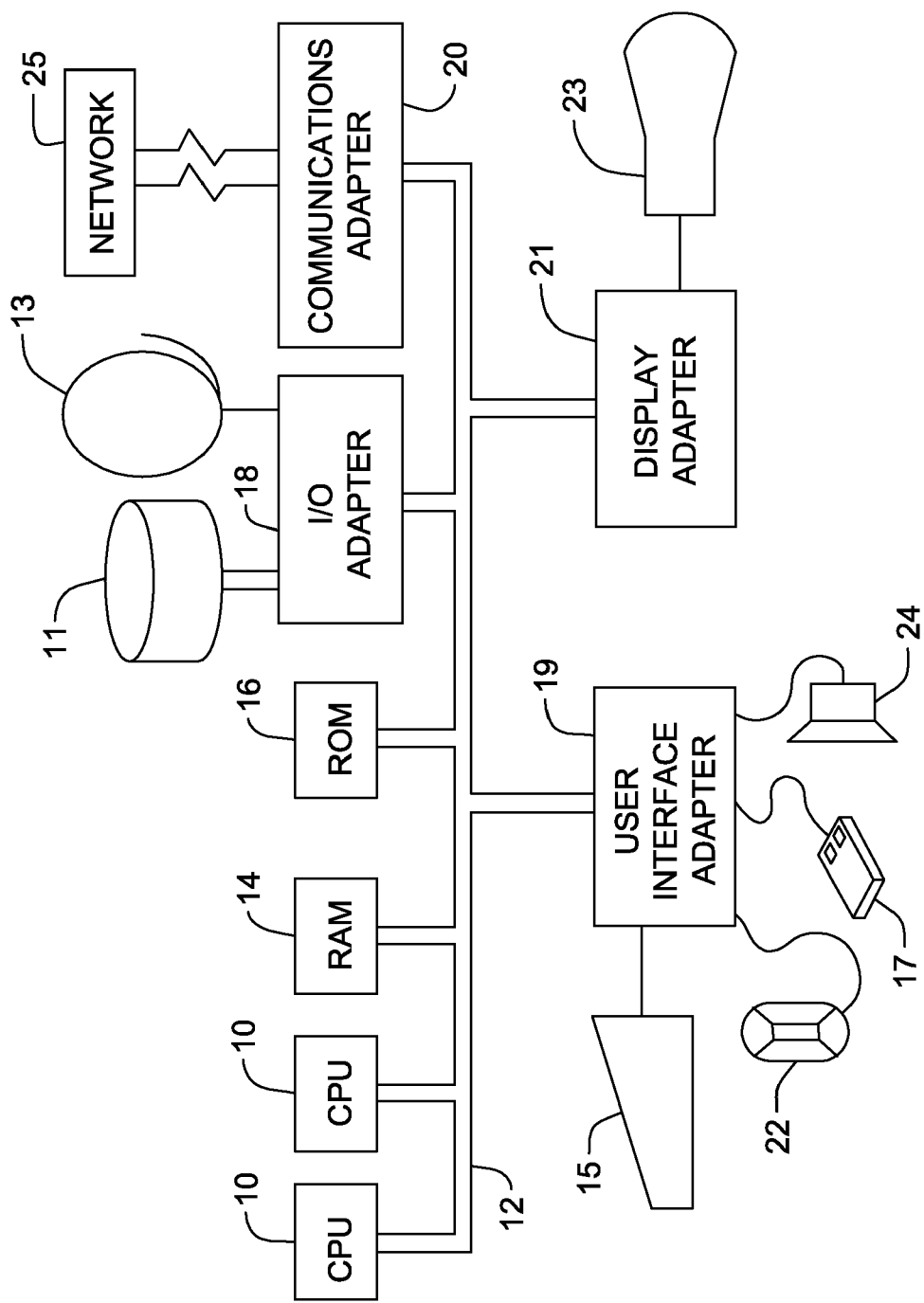
FIG. 8 is a diagram illustrating a program storage device for automated and dynamic management of query views for database workloads.

A representative hardware environment for practicing the embodiments of the invention is depicted in FIG. 8. This schematic drawing illustrates a hardware configuration of an information handling/computer system in accordance with the embodiments of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

Accordingly, the embodiments of the invention provide an automated, dynamic view management scheme that materializes views on-demand as a workload is executing and manages the views with an LRU cache. In order to maximize the benefit of executing queries with materialized views, the scheme makes an adaptive tradeoff between the view materializations, base table accesses, and the benefit of view hits in the cache. To find the workload permutation that produces the overall highest net benefit, a genetic method is used to search the N! solution space.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments of the invention have been described in terms of preferred embodiments, those skilled in the art will recognize that the embodiments of the invention can be practiced with modification within the spirit and scope of the appended claims.

REFERENCES

[1] Daniel C. Zilio, Calisto Zuzarte, Sam Lightstone, Wenbin Ma, Roberta Cochrane Guy M. Lohman, Hamid Pirahesh, Latha S. Colby, Jarek Gryz, Eric Alton, Dongming Liang, and Gary Valentin. Recommending Materialized Views and Indexes with IBM DB2 Design Advisor. In *Proceedings of the International Conference on Autonomic Computing*, 2004.

[2] W. Lehner, B. Cochrane, H. Pirahesh, and M. Zaharioudakis. Applying Mass Query Optimization to Speed up Automatic Summary Table Refresh. In *Proceedings of the International Conference on Data Engineering*, 2001.

[3] Daniel C. Zilio, Jun Rao, Sam Lightstone, Guy M. Lohman, Adam Storm, Christian Garcia-Arellano, and Scott Fadden. DB2 Design Advisor: Integrated Automatic Physical Database Design. In *Proceedings of the International Conference on Very Large Data Bases*, 2004.

[4] Oracle Corp. http://www.oracle.com/.

[5] S. Agrawal, S. Chaudhuri, and V. Narasayya. Automated Selection of Materialized Views and Indexes for SQL Database. In *Proceedings of the International Conference on Very Large Data Bases*, 2000. 14

[6] J. Holland. *Adaptation in Natural and Artificial Systems: An Introductory Analysis with Applications to Biology, Control, and Artificial Intelligence*. MIT Press, 1992.

[7] D. Goldberg. *Genetic Algorithms in Search, Optimization and Machine Learning*. Kluwer Academic Publishers, 1989.

[8] L. Davis. Job Shop Scheduling with Genetic Algorithms. In *Proceedings of the International Conference on Genetic Algorithms*, pages 136-140, 1985.

[9] Elke A. Rundensteiner, Andreas Koeller, and Xin Zhang. Maintaining data warehouses over changing information sources. *Communications of the ACM*, 43(6):57-62, 2000.

[10] Latha S. Colby, Timothy Griffin, Leonid Libkin, Inderpal Singh Mumick, and Howard Trickey. Algorithms for Deferred View Maintenance. In *Proceedings of the ACM SIGMOD International Conference on Management of Data*, pages 469-480, June 1996.

[11] Dallan Quass, Ashish Gupta, Inderpal Mumick, and Jennifer Widom. Making Views Self-Maintainable for Data Warehousing. In *Proceedings of the International Conference on Parallel and Distributed Information Systems*, December 1996.

[12] D. Agrawal, A. El Abbadi, A. Singh, and T. Yurek. Efficient View Maintenance in Data Warehouses. In *Proceedings of the 1997 ACM International Conference on Management of Data*, pages 417-427, May 1997.

[13] K. Salem, K. S. Beyer, R. Cochrane, and B. G. Lindsay. How to roll a join: Asynchronous Incremental View Maintenance. In *Proceedings of the 2000 ACM International Conference on Management of Data*, pages 129-140, May 2000.

[14] Gary Valentin, Michael Zuliani, Daniel C. Zilio, Guy M. Lohman, and Alan Skelley. DB2 Advisor: An Optimizer Smart Enough to Recommend Its Own Indexes. In *Proceedings of the International Conference on Data Engineering*, 2000.

[15] P. Shivam, A. Iamnitchi, A. R. Yumerefendi, and J. S. Chase. Model-driven placement of compute tasks and data in a networked utility. In *Proceedings of the International Conference on Autonomic Computing*, pages 344-345, 2005.

[16] S. Adali, K. S. Candan, Y. Papakonstantinou, and V. S. Subrahmaninan. Query Caching and Optimization in Distributed Mediator Systems. In *Proceedings of the 1996 ACM International Conference on Management of Data*, pages 137-148, May 1996.

[17] J. Shim, P. Scheuermann, and R. Vingralek. Dynamic Caching of Query Results for Decision Support Systems. In *Proceedings of the 1999 Symposium on Statistical and Scientific Data Base Management*, pages 254-263, 1999.

[18] Q. Luo, J. F. Naughton, R. Krishnamurthy, P. Cao, and Y. Li. Active Query Caching for Database Web Servers. In *Proceedings of the 2000 WebDB (informal proceedings)*, pages 29-34, 2000.

[19] C. Chen and N. Roussopoulos. The Implementation and Performance Evaluation of the ADMS Query Optimizer: Integrating Query Result Caching and Matching. In *Proceedings of the 1994 Conference on Extending Data Base Technology*, pages 323-336, 1994.

[20] K. Amiri, S. Park, R. Tewari, and S. Padmanabhan. DBProxy: A Dynamic Data Cache for Web Applications. In *Proceedings of the International Conference on Data Engineering*, 2003.

[21] The TimesTen Team. Mid-tier Caching: the TimesTen Approach. In *Proceedings of 2002 ACM SIGMOD Conference*, Madison, Wis., USA, June 2002.

[22] Paul Larson, Jonathan Goldstein, and Jingren Zhou. MTCache: Transparent Mid-Tier Database Caching in SQL Server. In *Proceedings of the International Conference on Data Engineering*, 2004. 15

[23] Jonathan Goldstein and Paul Larson. Optimizing Queries Using Materialized Views: A Practical, Scalable Solution. In *Proceedings of the ACM SIGMOD International Conference on Management of Data*, 2001.

[24] Gen M. and R. Cheng. *Genetic Algorithms and Engineering Optimization*. Wiley-Interscience, 1999.

What is claimed is:

1. A computer-implemented method for dynamic management of materialized query tables (MQTs) for a workload queue, said method comprising:
   inputting said workload queue comprising an ordered number of queries, and a database size allocated to a least recently used (LRU) MQT cache;
   generating candidate MQTs for said ordered number of queries based on common portions of said ordered number of queries;
   calculating a benefit for each of said candidate MQTs, wherein said benefit corresponds to a time reduction in accessing said each of said candidate MQTs versus accessing a base table, minus an overhead time of creating said required each of said candidate MQTs;
   creating a schedule for materialization of said candidate MQTs in said LRU MQT cache, based on said ordered number of queries and an ordered value of said benefit for said each of said candidate MQTs and their respective sizes;
   executing said ordered number of queries of said database workload queue; and
   materializing and storing said candidate MQTs, according to said schedule, until said LRU MQT cache is filled.

2. The method according to claim 1, wherein said accessing of said each of said candidate MQTs from said LRU MQT cache comprises a lower processing cost than accessing said base table.

3. The method according to claim 1, wherein, prior to said executing of said ordered number of queries, said LRU MQT cache comprises zero MQTs.

4. The method according to claim 1, further comprising reordering, prior to executing said ordered number of queries, said ordered number of queries.

5. The method according to claim 4, wherein said reordering of said ordered number of queries comprises:
searching a permutation space, N!, determined by a number, N, of said ordered number of queries, to find a highest value of benefit for a particular order of N queries using a genetic search heuristic.

6. The method according to claim 5, further comprising assigning said particular order of N queries to said schedule.

7. The method according to claim 1, further comprising, during said executing of said ordered number of queries, maintaining a candidate MQT that is to be evicted by an LRU policy from said LRU MQT cache, when said candidate MQT is required by a current query.

8. A computer-implemented method for dynamic management of materialized query tables (MQTs) for a workload queue, said method comprising:
inputting said workload queue comprising an ordered number of queries, and a database size allocated to a least recently used (LRU) MQT cache;
generating candidate MQTs for said ordered number of queries based on common portions of said ordered number of queries;
calculating a benefit for each of said candidate MQTs, wherein said benefit corresponds to a time reduction in accessing said each of said candidate MQTs versus accessing a base table, minus an overhead time of creating said each of said candidate MQTs;
creating a schedule for materialization of said candidate MQTs in said LRU MQT cache, based on said ordered number of queries and an ordered value of said benefit for said each of said candidate MQTs and their respective sizes:
reordering said ordered number of queries to find a highest value of benefit for a particular order of N queries and substituting said particular order for said schedule;
executing said ordered number of queries of said database workload queue; and
materializing and storing said candidate MQTs, according to said schedule, until said LRU MQT cache is filled.

9. The method according to claim 8, wherein said accessing of said each of said candidate MQTs from said LRU MQT cache comprises a lower processing cost than accessing said base table.

10. The method according to claim 8, wherein, prior to said executing of said ordered number of queries, said LRU MQT cache comprises zero MQTs.

11. The method according to claim 8, wherein said reordering of said ordered number of queries comprises:
searching a permutation space, N!, determined by a number, N, of said ordered number of queries, to find a highest value of benefit for a particular order of N queries using a genetic search heuristic.

12. The method according to claim 8, further comprising, during said executing of said ordered number of queries, maintaining a candidate MQT that is to be evicted by an LRU policy from said LRU MQT cache, when said candidate MQT is required by a current query.

13. A computer program storage medium readable by a computer, tangibly embodying a program of instructions executable by said computer to perform a method for dynamic management of query views for database workloads, said method comprising:
inputting said workload queue comprising an ordered number of queries, and a database size allocated to a least recently used (LRU) MQT cache;
generating candidate MQTs for said ordered number of queries based on common portions of said ordered number of queries;
calculating a benefit for each of said candidate MQTs, wherein said benefit corresponds to a time reduction in accessing said each of said candidate MQTs versus accessing a base table, minus an overhead time of creating said each of said candidate MQTs;
creating a schedule for materialization of said candidate MQTs in said LRU MQT cache, based on said ordered number of queries and an ordered value of said benefit for said each of said candidate MQTs and their respective sizes;
executing said ordered number of queries of said database workload queue; and
materializing and storing said candidate MQTs, according to said schedule, until said LRU MQT cache is filled.

14. The method of said program storage medium according to claim 13, wherein said accessing of said each of said candidate MQTs from said LRU MQT cache comprises a lower processing cost than accessing said base table.

15. The method of said program storage medium according to claim 13, wherein, prior to said executing of said ordered number of queries, said LRU MQT cache comprises zero MQTs.

16. The method of said program storage medium according to claim 13, further comprising reordering, prior to executing said ordered number of queries, said ordered number of queries.

17. The method of said program storage medium according to claim 16, wherein said reordering of said ordered number of queries comprises:
searching a permutation space, N!, determined by a number, N, of said ordered number of queries, to find a highest value of benefit for a particular order of N queries using a genetic search heuristic.

18. The method of said program storage medium according to claim 17, further comprising assigning said particular order of N queries to said schedule.

19. The method of said program storage medium according to claim 13, further comprising, during said executing of said ordered number of queries, full maintaining a candidate MQT that is to be evicted by an LRU policy from said LRU MQT cache, when said candidate MQT is required by a current query.

* * * * *